US006681324B1

(12) United States Patent
Anderson

(10) Patent No.: US 6,681,324 B1
(45) Date of Patent: Jan. 20, 2004

(54) APPLICATION APPLIANCE ENABLING OPERATING SYSTEM AND APPLICATIONS TO RUN FROM A CDROM BY DETERMINING LOCAL CONFIGURATION AND LICENSE STATUS

(75) Inventor: Daniel Phillips Anderson, Richmond, VA (US)

(73) Assignee: Cisco Technology, Inc., San Jose, CA (US)

( * ) Notice: Subject to any disclaimer, the term of this patent is extended or adjusted under 35 U.S.C. 154(b) by 588 days.

(21) Appl. No.: 09/656,841

(22) Filed: Sep. 7, 2000

(51) Int. Cl.$^7$ .......................... G06F 15/177; G06F 9/24
(52) U.S. Cl. ....................................................... 713/1
(58) Field of Search ............................. 713/1, 2; 714/2; 709/203

(56) References Cited

U.S. PATENT DOCUMENTS

| | | | | |
|---|---|---|---|---|
| 5,579,222 A | * | 11/1996 | Bains et al. | 717/167 |
| 5,799,187 A | | 8/1998 | McBrearty | |
| 6,012,088 A | * | 1/2000 | Li et al. | 709/219 |
| 6,029,196 A | * | 2/2000 | Lenz | 709/221 |
| 6,094,679 A | * | 7/2000 | Teng et al. | 709/220 |
| 6,122,734 A | * | 9/2000 | Jeon | 713/2 |
| 6,154,835 A | * | 11/2000 | Chrabaszcz et al. | 713/1 |
| 6,339,826 B2 | * | 1/2002 | Hayes, Jr. et al. | 713/166 |
| 6,421,671 B1 | * | 7/2002 | Bryan et al. | 707/10 |
| 6,453,413 B1 | * | 9/2002 | Chen et al. | 713/2 |
| 6,529,992 B1 | * | 3/2003 | Thomas et al. | 711/1 |

FOREIGN PATENT DOCUMENTS

| EP | 793170 A1 * | 9/1997 | G06F/9/445 |
|---|---|---|---|
| EP | 0978785 A1 * | 9/2000 | |

OTHER PUBLICATIONS

Eckert et al. "A top–down driven, object–based approach to application–specific operating system design", Object–Orientation in Operating Systems, 1995., Fourth International Workshop on Aug. 14, 1995–Aug. 15, 1995.*

* cited by examiner

Primary Examiner—Thomas Lee
Assistant Examiner—Eric Chang
(74) Attorney, Agent, or Firm—Leon R. Turkevich; Edward J. Steimberger

(57) ABSTRACT

A machine having a non-volatile storage medium interface such as a CDROM drive and a local hard drive is configured for execution of an application process from a non-volatile storage medium such as a CDROM. The method of configuring the machine includes first loading into the machine, from a removable non-volatile storage medium in communication with the non-volatile storage medium interface, an operating system environment. The local hard drive is accessed to determine if the machine has a signature indicating that the machine had been configured previously. In response to a determination that the machine was not previously configured, a network connection to a server is established to access configuration files for use by the operating system environment and/or the application process. A local file system is loaded from the removable non-volatile storage medium onto the local hard drive, based on the accessed configuration files. The application process is executed from the removable non-volatile storage medium.

15 Claims, 3 Drawing Sheets

APPLICATION APPLIANCE ENABLING OPERATING SYSTEM AND APPLICATIONS TO RUN FROM A CDROM BY DETERMINING LOCAL CONFIGURATION AND LICENSE STATUS

BACKGROUND OF THE INVENTION

1. Field of the Invention

The present invention relates to a processor-based device having minimum prescribed hardware requirements enabling an operating system environment and an application process to be initiated from a CDROM.

2. Description of Related Art

As technology advances at a rapid pace, application development teams are put in the difficult position of trying to keep up with advancements in the operating system(s) (OS) as well as the hardware platforms that the OS run on. With the network becoming the prevalent technology within many industries, increasing amounts of specialized applications are being built to exist solely within the networked environment. These applications are expected to have the same, if not better, features and functionality that exist in the standard PC environment of today. In addition to the features and functionality, the network applications are now also expected to have the resiliency which the networking equipment of today provides, including low recovery rime, redundancy, high availability, and a small footprint. The network applications are also required to show the same performance as if they were on a standard PC or server. Higher expectations, coupled with a shorter "time to market", means more time should be spent developing applications rather than having to troubleshoot the surrounding facilities i.e.: operating systems and hardware platforms. In deployment scenarios as well as the support of deployed product, the introduction of too many variables can consume the time of personnel while they isolate problems. These variables are introduced in many ways, of which the most common are system patches and hardware upgrades. Because of the infinite amount of changes that can be introduced into an environment, it is impossible to test all of the different scenarios.

Without resolving these issues, a software development company may see a significant impact on their ability to produce quality product in a timely manner. Further, many man-hours will be spent in the field trying to isolate problems with software versus problems within the operating system or the hardware itself.

Presently, software engineers need to be concerned with hardware requirements in developing software. Since todays computers are not considered to be throw-away items, software must be updated often to correspond with any hardware updates.

SUMMARY OF THE INVENTION

There is a need for an arrangement that enables a software development company to provide software applications with minimal concern with hardware requirements.

These and other needs are attained by the present invention, where a machine having a non-volatile storage medium interface such as a CDROM drive and a local hard drive is configured for execution of an application process from a non-volatile storage medium such as a CDROM. The method includes first loading into the machine, from a removable non-volatile storage medium in communication with the non-volatile storage medium interface, an operating system environment. The local hard drive is accessed to determine if the machine has a signature indicating that the machine had been configured previously. In response to a determination that the machine was not previously configured, a network connection to a server is established to access configuration files for use by the operating system environment and/or the application process. A local file system is loaded from the removable non-volatile storage medium onto the local hard drive, based on the accessed configuration files. The application process is executed from the removable non-volatile storage medium.

In accordance with another aspect of the invention, a device is provided for enabling an operating system environment and an application process to be initiated from a removable non-volatile storage medium. The device includes a processor, memory, a non-volatile storage medium interface, and a local hard drive. The device is configured such that when the removable non-volatile storage medium is loaded into the non-volatile storage medium interface, the device 1) initiates the operating system environment based on loading a first sequences of instructions from the removable non-volatile storage medium into the memory, and 2) executes the application process based on loading a second sequence of instructions from the removable non-volatile storage medium into the memory.

In accordance with yet another aspect of the invention, a non-volatile storage medium is constructed and arranged to be removably loaded into a non-volatile storage medium interface of a processor-based device. The storage medium has stored thereon a first sequence of instructions for generation of an operating system environment by a processor, second sequence of instructions for generation of an application process by a processor, a first executable routine for causing the processor to initiate execution of the operating system environment in the device, and a second executable routine for causing the processor to configure the device for executing the application process from the non-volatile storage medium.

Hence, in accordance with the invention, having the operating system environment as well as the application process "locked" on the storage medium or CDROM prevents any chance of changes being made to the environment in which the application functions.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
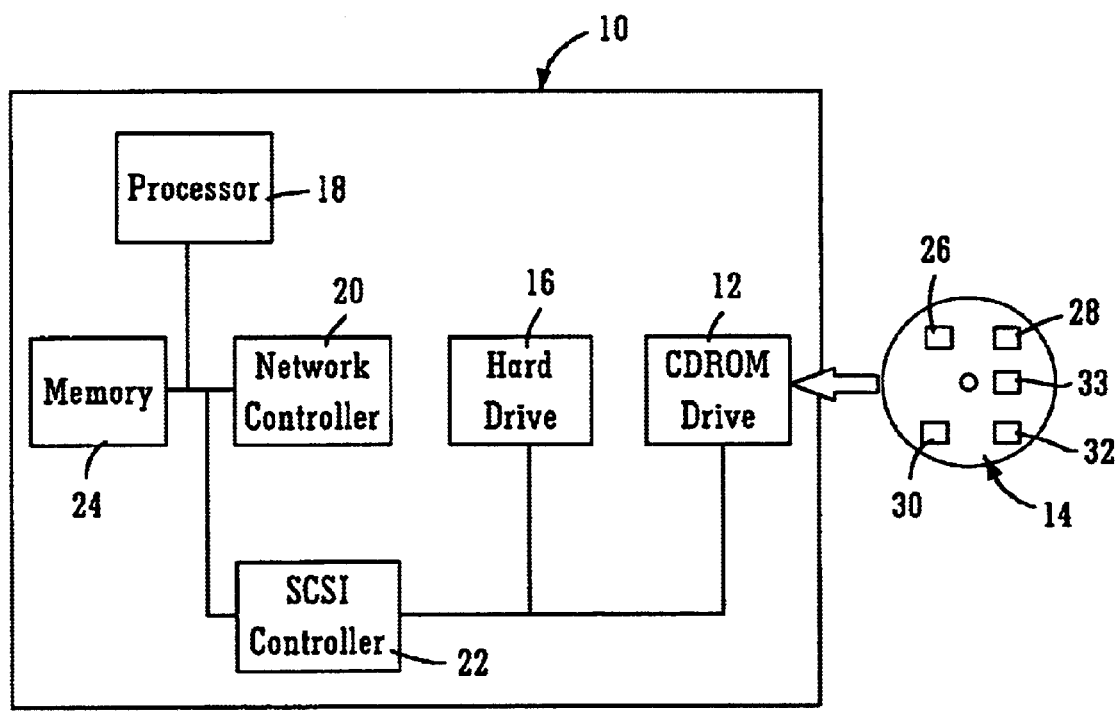
FIG. 1 is a schematic illustration of an application appliance having a bootable CDROM drive for receiving a CDROM in accordance with the principles of the present invention.

With reference to FIG. 1, an application appliance 10 is shown having a bootable non-volatile storage medium interface 12 for receiving a removable non-volatile storage medium 14, in accordance with the principles of the present invention. In the illustrated embodiment, the storage medium interface 12 is a CDROM drive and the storage medium 14 is a CDROM. The application appliance 10 is considered an "appliance" since it has only the minimum hardware (e.g. memory, processor, device controllers, etc.) to run an application and is thus considered a "throw-away" item. The application appliance 10 includes a hard drive 16, a processor 18, a network controller 20, a SCSI controller 22, and memory 24. The application appliance 10 is preferably of INTEL architecture.

The CDROM 14 includes an operating system environment 26 and a first executable routine 28, each embodied as a stored sequence of instructions executable by the processor 18, for initiating execution of the operating system in a processor-based device such as the application appliance 10. The CDROM also includes an application process 30 and a second executable routine 32, each also embodied as a stored sequence of instructions executable by the processor, for configuring the device for executing the application from the CDROM 14. Drivers 33 are also included on the CDROM 14.

Figure 2:
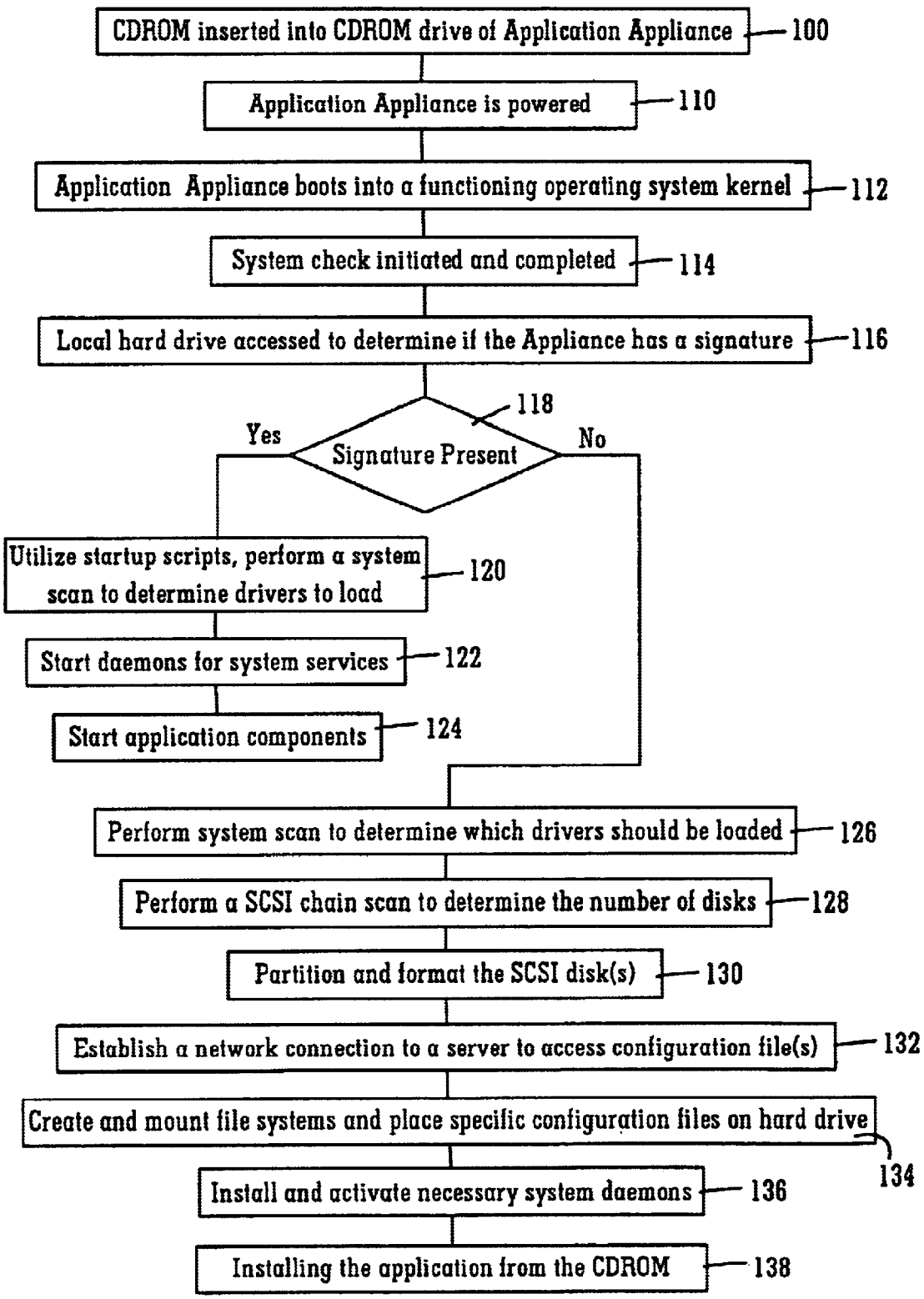
FIG. 2 is a flow diagram showing automatic configuration of the application appliance of FIG. 1 using CDROM.

In accordance with the invention, and with reference to FIGS. 1–2, the bootable CDROM 14 is inserted into the CDROM drive 12 in step 100. The application appliance 10 is then powered on in step 110. In step 112, the application appliance 10 boots from the CDROM 14 into a functioning operating system (preferably a UNIX based) kernel, and proceeds with the initial system check (often referred to as init level 1 or S) in step 114. Thus, an operating system environment is initiated based on loading a first sequence of instructions from the CDROM 14 into the memory 24. Once the system check is competed, the local hard drive 16 is accessed in step 116 to determine in step 118 if the application appliance 10 has a signature indicating that the application appliance 10 had been configured previously. If a signature is found, then a normal system start is initiated. The normal system start includes:

- utilizing startup scripts (rc.d) and performing a system scan to provide the necessary information as to what modules (drivers) to load in step 120,
- starting the daemons for the system services in step 122, and
- starting the application components in step 124 by loading a second sequence of instructions from the non-volatile storage medium into the memory 24.

If a signature is not present, an initial configuration is performed. This configuration can be done automatically or manually. Automated setup procedures are read from a "flat" text file, or from information stored on an IP based server. The automated set-up is shown in FIG. 2 and includes:

Performing a system scan to determine which modules (type) should be loaded (e.g., SCSI and Network) in step 126.

Performing a SCSI chain scan in step 128 to determine the number of disks, which in turn will decide how the disk(s) will be set up (e.g., Standalone or Software Redundant Array of Independent Disks (RAID)).

Partitioning and formatting the SCSI disk(s) based on requirements set forth by the resident (intended) application in step 130.

Establishing a network connection (such as ARP/RARP) to a server in step 132 to access configuration file(s). These files will dictate how the application appliance 10 should be setup.

Creating and mounting file systems and placing specific configuration files on the hard drive 16 in step 134. This step includes creating a small partition designated for license information.

Installing and activating necessary system daemons in step 136.

Installing, in step 138, the application from the CDROM 14 as well as a generic "trial" license that will allow some form of limited software capability (designed to be replaced by the active license later in the process). Thus, the application is executed based on loading a second sequence of instructions from the non-volatile storage medium into the memory 24. A key is tied to a number embedded on the CDROM 14 and the key also serves as the "signature" used to determine whether the system will be installed or started. The system is now setup for "basic" operation. The system's management access methods should now be used to do in-depth configuration changes. (Telnet, http or ftp, flat configuration files etc.). If the users wants to use the CDROM 14 more than once, the user can contact the CDROM provider and obtain aan active license to be installed on the licensing potion of the hard drive 16 which is accessed upon starting the application appliance 10.

Figure 3:
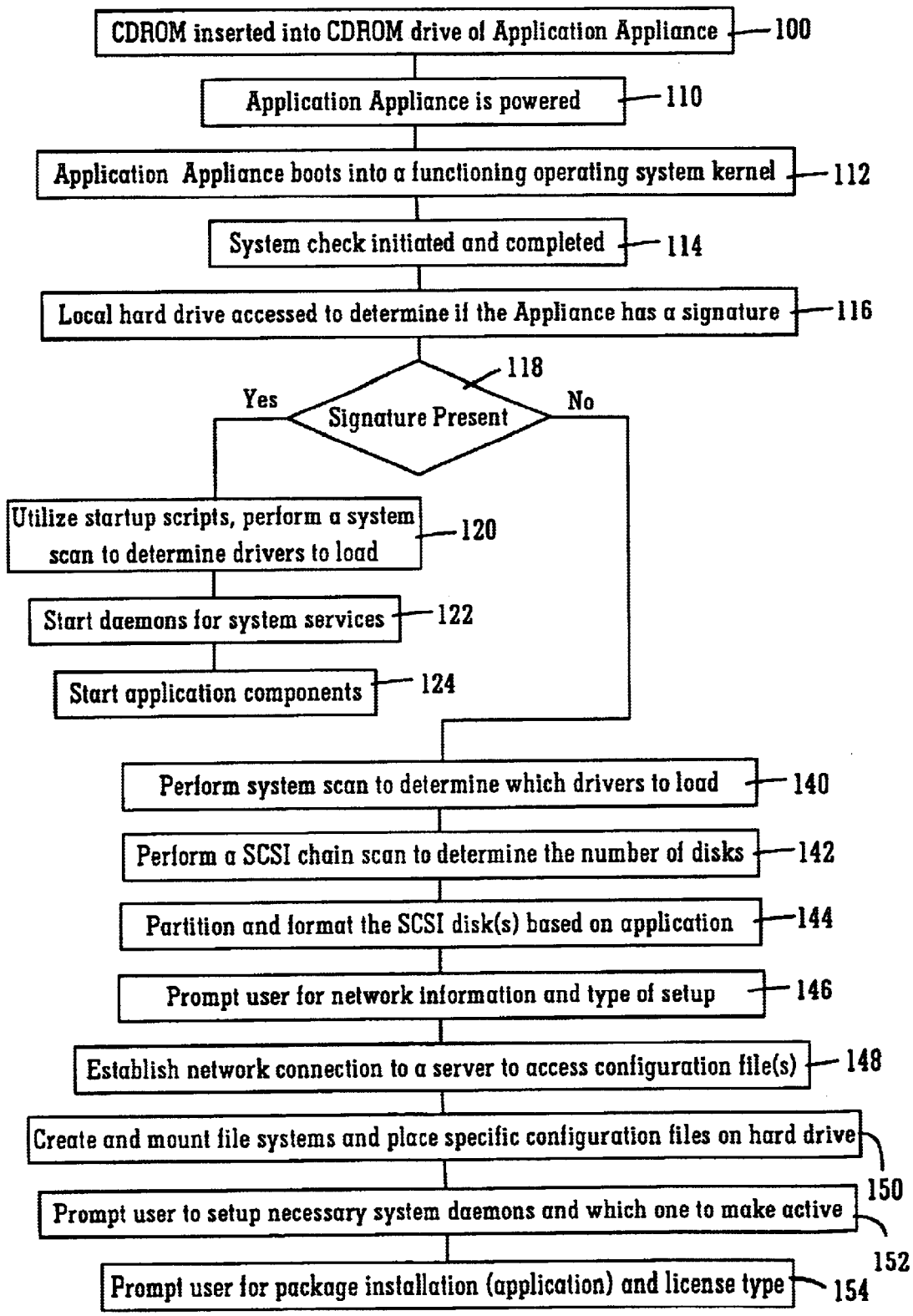
FIG. 3 is a flow diagram showing manual configuration of the application appliance of FIG. 1 using the CDROM.

The manual setup procedure consists of a series of questions relating to system specific parameters. The manual setup is shown in FIG. 3 and includes:

Performing a system scan in step 140 to determine which modules (type) should be loaded (e.g., SCSI and Network).

Performing a SCSI chain scan in step 142 to determine the number of disks, which in turn will decide how the disk(s) will be set up (e.g., Standalone or RAID).

Partitioning and formatting the SCSI disk(s) in step 144 based on requirements set forth by the resident (intended) application.

Prompting the user for network information and type of setup (server of local) in step 146. A network connection to a server is established in step 148 to access configuration file(s). These files will dictate how the application 10 should be setup.

Creating and mounting file systems and placing specific configuration files on the hard drive 16 in step 150. This step includes creating a small partition designated for license information.

Prompting the user in step 152 to setup necessary system daemons and which one to make active.

Prompting the user in step 154 for package installation (application), the type of license key setup (trial or existing license). Thus, the application is executed based on loading a second sequence of instructions from the non-volatile storage medium into the memory 24. The key also serves as the "signature" used to determine whether the system will be installed or started. The system is now setup for "basic" operation. The system's management access methods can now be used to do in-depth configuration changes. (Telnet, http or ftp, flat configuration files etc.).

A primary advantage of the application appliance 10 using the CDROM 14 of the invention is the resilient properties of the CDROM itself. These disks are easily used in any equipment that has bootable CDROM drive. With this portability used in conjunction with some form of RAID configuration, restoration times from a hardware failure will be greatly reduced. This paradigm also removes the software development company from the hardware business, and pushes the responsibility of hardware compatibility back to the operating system producer. Having the operating system as well as the application "locked" on the CDROM prevents any chance of changes being made to the environment in which the application functions, running the operating system from the CDROM provides consistency across multiple units. Another advantage is that, as long as the equipment meets a basic set of parameters, the end user has the freedom to choose what equipment they want to use (form factor, manufacturer, number of processors, etc.)

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method of configuring a machine, having a non-volatile storage medium interface and a local hard drive, for execution of an application process from a removable non-volatile storage medium, the method comprising:

first loading into the machine, from a removable non-volatile storage medium in communication with the non-volatile storage medium interface, an operating system environment, accessing the local hard drive to determine if the machine has a signature indicating that the machine had been configured previously, in response to a determination that the machine was not previously configured, establishing a network connection to a server to access configuration files for use by at least one of the operating system environment and the application process, second loading from the removable non-volatile storage medium, a local file system onto the local hard drive, based on the accessed configuration files, and executing the application process from the removable non-volatile storage medium.

2. The method of claim 1, wherein the non-volatile storage medium interface is a CDROM drive and the removable non-volatile storage medium is a CDROM.

3. The method of claim 1, further comprising installing from the removable non-volatile storage medium a SCSI driver for accessing the local hard drive.

4. The method of claim 1, further comprising installing from the removable non-volatile storage medium a network driver.

5. The method of claim 3, further comprising scanning a SCSI chain to determine the number of SCSI hard disks in the chain, and partitioning and formatting the hard disks based on requirements set forth by the application.

6. The method of claim 5, wherein the SCSI hard disks are configured for software redundant array of independent disks (RAID).

7. The method of claim 1, wherein the step of second loading step includes defining a partition designated for license information relating to information on the removable non-volatile storage medium.

8. The method of claim 1, further including keying the license information to the removable non-volatile storage medium, the key serving as the signature.

9. The method of claim 1, wherein the first loading step includes booting the machine into a functioning UNIX based operating system kernel.

10. The method of claim 1, further including installing and activating system daemons from the removable non-volatile storage medium.

11. A device enabling an operating system environment and an application process to be initiated from a non-volatile storage medium, the device comprising:

a processor,
   memory,
   a non-volatile storage medium interface,
   a local hard drive,
   a network controller, and
   a SCSI controller, the device being configured such that when the non-volatile storage medium is loaded into the non-volatile storage medium interface, the device 1) initiates the operating system environment based on loading a first sequences of instructions from the non-volatile storage medium into the memory, 2) accesses the local hard drive to determine if the machine has a signature indicating that the machine had been configured previously, and in response to a determination that the machine was not previously configured, establishes a network connection to a server to access configuration files for use by at least one of the operating system environment and the application process, and 3) executes the application process based on loading a second sequence of instructions from the non-volatile storage medium into the memory, wherein the non-volatile storage medium interface is a CDROM drive and the non-volatile storage medium is a CDROM.

12. A non-volatile storage medium constructed and arranged to be removably loaded into a non-volatile storage medium interface of a processor-based device, the medium comprising:

a first sequence of instructions for generation of an operating system environment by a processor, a second sequence of instructions for generation of an application process by a processor, a first executable routine for causing the processor to initiate execution of the operating system environment in the device, a second executable routine for causing the processor to configure the device for executing the application process from the non-volatile storage mediums, a SCSI driver for accessing a local hard drive to determine if the machine has a signature indicating that the machine had been configured previously, and a network driver for establishing a network connection to a server to access configuration files for use by at least one of the operating system environment and the application process, in response to a determination that the machine was not previously configured.

13. The non-volatile storage medium of claim 12, wherein the storage medium is a CDROM.

14. The non-volatile storage medium of claim 12, further including a sequence of instructions for generation of a partition on the hard drive for licensing information relating to information on the non-volatile storage medium.

15. A method of executing an application from a non-volatile storage medium, the method comprising:

providing a device having a processor, memory, a non-volatile storage medium interface, and a local hard drive, providing a removable non-volatile storage medium having stored thereon a first sequence of instructions for generation of an operating system environment by a processor, a second sequence of instructions for generation of an application process by a processor, a first executable routine for causing the processor to initiate execution of the operating system environment in the device, and a second executable routine for causing the processor to configure the device for executing the application process from the non-volatile storage medium, loading a removable non-volatile storage medium into the non-volatile storage medium interface thereby initiating the operating system environment based on loading the first sequences of instructions from the removable non-volatile storage medium into the memory, and executing the application process based on loading the second sequence of instructions from the removable non-volatile storage medium into the memory, loading, from the removable non-volatile storage medium, a local file system on the local hard drive, wherein the loading step includes defining a partition designated for license information relating to information on the non-volatile storage medium.

* * * * *